US006499364B1

(12) United States Patent
Suovaniemi

(10) Patent No.: US 6,499,364 B1
(45) Date of Patent: Dec. 31, 2002

(54) TIP FOR A SUCTION DEVICE

(75) Inventor: Osmo Suovaniemi, Helsinki (FI)

(73) Assignee: Biohit Oyj, Helsinki (FI)

( * ) Notice: Subject to any disclaimer, the term of this patent is extended or adjusted under 35 U.S.C. 154(b) by 0 days.

(21) Appl. No.: 09/382,787

(22) Filed: Aug. 25, 1999

(30) Foreign Application Priority Data

Aug. 26, 1998 (FI) ........ 981828
Jan. 8, 1999 (FI) ........ 990026

(51) Int. Cl.$^{7}$ ........ G01N 1/14; B01L 3/02
(52) U.S. Cl. ........ 73/864.15; 73/864.14; 73/864.16
(58) Field of Search ........ 73/864.15, 864.14, 73/824.01, 864.02, 864.03, 864.16

(56) References Cited

U.S. PATENT DOCUMENTS

| | | | | | |
|---|---|---|---|---|---|
| 3,981,297 | A | * | 9/1976 | Dunn et al. | |
| 4,267,729 | A | * | 5/1981 | Eddelman et al. | 73/864.02 |
| 4,444,062 | A | | 4/1984 | Bennett et al. | 73/863.32 |
| 4,852,620 | A | | 8/1989 | Jakubowicz et al. | 73/563.32 X |
| 4,999,164 | A | * | 3/1991 | Puchinger et al. | 73/864.15 X |
| 5,209,128 | A | * | 5/1993 | Whelan | 73/864.15 X |
| 5,406,856 | A | | 4/1995 | Kuhn | 73/864.14 |
| 5,445,797 | A | * | 8/1995 | Flesher | 73/864.11 X |
| 5,496,523 | A | | 3/1996 | Gazit et al. | 73/864.01 X |
| 5,556,598 | A | * | 9/1996 | Raybuck et al. | 210/460 |
| 5,580,529 | A | * | 12/1996 | DeVaughn et al. | 73/864.14 X |
| 6,045,757 | A | * | 4/2000 | Moriarty et al. | 422/100 |
| 6,117,344 | A | * | 9/2000 | Smith | 73/864.3 X |
| 6,182,517 | B1 | * | 2/2001 | Zähner | 73/864.01 |

FOREIGN PATENT DOCUMENTS

| | | | |
|---|---|---|---|
| JP | 63-286770 | * 11/1988 | 422/100 |

OTHER PUBLICATIONS

Derwent–Acc:No: 1996–06752; Abstract of NL 9400956A & Clipped Image, Jan. 1996.*
Inventor Wolters "Seal, Pref. Including Profile of Fluoroelastomer—is for Medium Tight Closure of Opening Between Movable Components Forming Part of Device for Dealing with Agressive Materials Under Water".*
Derwent–Acc–No: 1981–73045D; Abstract of RD 209050A "Burette with Leakproof Valve–with Stationary and movable Flat Surfaced Plastic Parts Spring Biosed Together".*

* cited by examiner

*Primary Examiner*—Thomas P. Noland
(74) *Attorney, Agent, or Firm*—Birch, Stewart, Kolasch & Birch, LLP

(57) ABSTRACT

A top with a mantle wall defining a sample space, for receiving a liquid sample, the tip having first open end to be inserted into a liquid and a second open end for attaching the top to a suction device intended for dispensing, which tip is provided with a membrane device closing the gas and liquid passage in a gas and liquid tight manner from the first end of the tip to the suction device, when the tip is attached to the suction device, the membrane of the membrane device being made of a gas and liquid impermeable, flexible, reversibly deformable material. Also, a method for dispensing a liquid with a suction device has an end part, which encloses a cylindrical space having a reciprocating device, such as a plunger, for receiving a sample and for removing it therefrom, in which suction device the plunger is brought in contact with the membrane device comprising a membrane, made of a gas and liquid impermeable, flexible, reversibly deformable material, for changing the volume delimited by the membrane from the sample space of the disposable tip for taking a sample and/or removing it, and that the tip is removed from the end part of the suction device by translating the movement of the plunger relative to the tip.

11 Claims, 4 Drawing Sheets

TIP FOR A SUCTION DEVICE

FIELD OF THE INVENTION

The object of this invention is a tip with a mantle wall defining a sample space, for receiving a liquid sample, the tip having a first open end to be inserted into a liquid and a second open end for attaching the tip to a suction device, such as a mechanical or electronic pipette, intended for dispensing, transferring, diluting, titrating, mixing, or a combination of all, or some of these operations.

The object of the invention is also a method for dispensing, transferring, diluting, titrating, mixing, or a combination of all, or some of these operations with a suction device, such as a mechanical or electronic pipette having an end part, which encloses a cylindrical space having a reciprocating means, such as a plunger, and having a removably attached tip.

The said suction devices comprise a body and an associated end part, the open end of which being directed away from the body for removably attaching a disposable tip having a sample space for receiving a liquid sample, the end part encloses the cylindrical space having a reciprocatingly movable means, a plunger, for receiving a sample and for removing it therefrom.

When in the following description the words 'suction device' or 'pipette' are used, they generally mean all types of suction devices defined above, which suction devices function as pipettes, dispensers, diluter, titraters, or mixers, or in addition as a combination of all or some of these operations. A mechanical or an electronic pipette can be a manually operated separate device or part of some apparatus, of an analysing device, etc.

DESCRIPTION OF THE RELATED ART

Over approximately the past three decades pipettes have been in use having attached liquid reservoirs, that is pipette tips, from which liquid has escaped to the inner parts of the pipette, for example due to careless operation of the pipette, or in the form of liquid molecules vaporized from the liquid. The contamination of the inner parts of the pipette has jeopardized labour safety and reduced or even completely terminated the reliable operation of the pipette itself. Naturally this cannot be accepted in laboratory work, which has to be precise as well as safe to users and patients. Also in scientific or in other such work this is not allowed.

Due to these problems pipette manufacturers recommend that the pipettes are disassembled and cleaned at regular intervals by the pipette users. In this procedure almost always also the plunger and the gasket of the pipette are re-lubricated and often also the pipette has to be re-calibrated, i.e. the pipetted, dispensed etc. liquid volumes are set to correspond to the volumes set on the scale of the pipette. This disassembling and reassembling of the pipette, in addition to being an inconvenient and laborious procedure, does not guarantee that the pipette would not contain infection agents or other contamination such as DNA- and RNase-contamination which interferes with PCR-work. Therefore some pipette manufacturers have started to manufacture pipettes, which are claimed to be sterilizable in an autoclave. Sterilization in the autoclave does not, however, remove DNA- and RNase-contamination from the pipette parts. It is a very tedious operation and often the operation itself damages parts of the pipette to such an extent that the pipette will not function sufficiently accurately and reliably any more. When the pipette is used after the sterilization, it is possible that it will be contaminated already with the first pipetting.

U.S. Pat. No. 5,406,856 discloses a suction device which is meant to be used with such disposable tips, which have a tip portion to be inserted into a liquid, the tip portion having an opening for taking a liquid sample and removing it and in which disposable tips the part to be adapted onto the end of the body of the suction device is closed towards the suction device. The form of this closed part and simultaneously its volume can be changed with a means within the end part of the body of the suction device. In this solution the contamination can be prevented, but the disposable tip used is a special tip.

U.S. Pat. No. 4,444,062 discloses a multichannel suction device having a flexible membrane mounted between the body of the suction device and an attached tipstand so, that the rods in the plunger movable within the body of the suction device come into contact with the membrane, when the plunger is pushed downwards. In this solution the membrane is secured either on the undersurface of the body or on the upper surface of the tipstand or two membranes are used of which the first one is secured on the undersurface of the body and the second one on the upper surface of the tipstand. The tipstand itself is mounted to the body with a screw connection. In an embodiment of this invention, the tipstand assembly consisting of a tipstand with attached tubes and tips attached to these and a membrane secured onto the upper surface of the tipstand can be one disposable moulded plastic unit which is mounted to the body of the suction device with a suitable quick connection method. In this publication, nothing is disclosed of the removal of the tipstand, tipstand assembly, or its parts from the body with a movement of the plunger or some other means, such as a tip remover or other such means.

BRIEF SUMMARY OF THE INVENTION

The disadvantages cited above can be avoided by using the solution for the disposable tip according to the invention. It is characterizing for the tip according to the invention that the tip is provided with a membrane means closing the gas and liquid passage in a gas and liquid tight manner from the first end of the tip to the suction device, when the tip is attached to the suction device, the membrane means comprising a membrane made of a gas and liquid impermeable, flexible, reversibly deformable material. The solution according to the invention prevents liquids to be dispensed and/or gases vaporizing therefrom from entering the inner parts of the pipette. In addition, the tip according to the Invention can be removed with the movement of the plunger or other similarly functioning means, which increases the ergonomy of the use of the pipette and working safety.

The object of the invention is also a method, which is characterized in that the reciprocatingly movable means within the cylindrical space enclosed by the end part of the suction device, is brought into contact with a membrane means in the sample space of the tip, the membrane means comprising a membrane, which is made of a gas and liquid impermeable, flexible, reversibly deformable material, for changing the volume delimited by the membrane from the sample space of the tip for taking a sample and/or removing it, and that the tip is removed from the end part of the suction device by translating the movement of the means to the tip.

The suction device itself used with the disposable tip, can be as such a known manually operated or e.g. electrical, and it can be independently operated or functioning as a part of some apparatus, e.g. pipette.

The disposable tip according to a preferred embodiment of the invention is attached to the end part of the suction device preferably against the inner wall of the cylindrical space within the end part with a friction joint. In another preferred embodiment according to the invention the disposable tip is attached e.g. with a friction joint against an inner, conical surface widening towards the end of the end part. The said cylindrical space or the said conical surface can also be provided with shoulders or projections, against which the disposable tip comes into contact when attached.

The disposable tip according to another preferred embodiment of the invention can also be attached onto the end of the end part of the suction device by using a suitable mounting means, such as a sleeve, attachable e.g. with a friction joint, and to which the disposable tip is attached e.g. with suitable holding means, such as projections.

Still in another preferred embodiment of the invention, the tip according to the invention can also be attached on the distal end of the end part of the suction device preferably with a friction joint.

According to the invention the tip is provided with a membrane means mounted into the sample space of the tip, the membrane means comprising a membrane made of a material, which is impermeable to air and liquids, is flexible, and reversibly deformable, in order to close the gas and liquid passage in a gas- and liquid-light manner from the first open end of the tip to the suction device, when the tip is attached to the suction device, whereby the means in the cylindrical space, moving reciprocatingly in the cylindrical space within the end part of the body of the suction device, when extending through an opening in the end part of the body into the sample space of the disposable tip, can be brought in contact with the said membrane to bring about a change in the volume delimited by the membrane means from the sample space of the disposable tip, for taking a sample and removing it.

According to a preferred embodiment of the invention, the mantle wall defining the sample space is rigid. In another preferred embodiment of the invention, the membrane of the membrane means is essentially stretched.

According to the invention the end of the sample space of the disposable tip facing the suction device is closed in a gas- and liquid-tight manner with a membrane, which is made of a flexible, reversibly deformable material, impermeable to air and liquids, whereby the means, such as a plunger, reciprocatingly moving in the cylindrical space within the end part of the body of the suction device, can be brought in contact with the said membrane for bringing about a change in the volume of the sample space of the disposable tip for taking a sample and/or removing it.

The form of the membrane depends naturally on the form of the sample space. According to a preferred embodiment of the invention, the membrane is secured to that surface of the mantle, which is facing the suction device e.g. by welding or gluing in connection with the manufacture of the disposable tip. The membrane can also be secured with corresponding methods onto the outer surface of the mantle defining the sample space of the tip in the vicinity of the second open end of the tip. In a preferred embodiment of the invention, the membrane is secured to the second end of the disposable tip device with a circular sleeve, to seal the membrane against the surface of the mantle defining the sample space of the disposable tip. In another preferred embodiment of the invention, the said circular sleeve comes into contact with a shoulder or a projection on the outer surface of the said mantle wall, thereby sealing the membrane against the surface of the said mantle wall.

In another preferred embodiment, the membrane is mounted to a frame, which in turn can be mounted in a gas- and liquid-tight manner into the said second open end of the tip and where it stays in the intended position e.g. under the influence of a friction force, preferably without any special mounting means.

In a preferred embodiment of the invention the said frame can be of a detachable kind.

According a preferred embodiment of the invention, the membrane means is sealingly adapted in the sample space in connection with the manufacturing of the disposable tip e.g. by welding or gluing. According to another preferred embodiment the membrane is secured to a frame, which can be adapted in a gas- and liquid-tight manner against the inside surface of the sample space of the disposable tip, and where it stays in its intended position e.g. under the influence of a friction force, preferably without any special mounting means. The membrane means can also be attached onto the inside surface of the sample space of the disposable tip by means of shoulders, projections, pegs, or other similar means on the inside surface of the disposable tip.

According to the invention the disposable tip can be detached from the end part of the suction device by causing the movement of the plunger moving in the cylindrical air space to be translated into a removal movement of the tip.

According to a preferred embodiment of the invention, the end of the disposable tip facing the suction device can thus be brought in contact with the plunger or with shoulders, pegs, or other similar means associated with the plunger for removing the disposable tip from the end part of the suction device with a movement of the plunger. Preferably the mantle defining the sample space of the disposable tip forms a surface in the second end of the disposable tip, against which surface the plunger moving within the cylindrical space or a shoulder at the end of the plunger can be brought in contact for removing the disposable tip with the movement of the plunger. Also a frame, onto which the membrane is secured, or a said circular sleeve used for securing the membrane, can form a surface against which the plunger or means associated therewith can be brought in contact for removing the disposable tip with the movement of the plunger.

In a preferred embodiment of the invention the membrane is secured to a frame having means, which can be brought in contact with the plunger, moving within the cylindrical air space of the end part of the suction device, or with shoulders, pegs, or other similar means belonging to the plunger, for removing the disposable tip and the membrane means with its frame mounted therein from the end part of the suction device with the movement of the plunger out of the opening of the end part of the suction device.

The tip according to the invention can be adapted also to laboratory work based on the PCR-technique, because the membrane means according to the invention in the disposable tip prevents the inner parts of the pipette from DNA- and RNase-contamination and thus the cross-contamination of different samples and reaction mixtures.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention is described with working examples with reference to the appended drawings which are given by way of illustration only, and thus are not limitative of the present invention, and wherein.

DETAILED DESCRIPTION OF THE INVENTION

Figure 1:
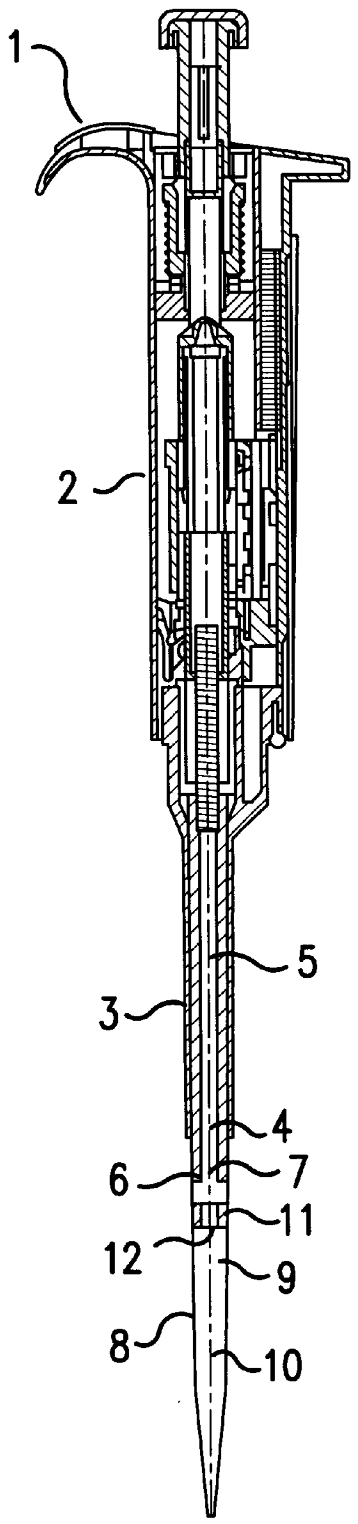
FIG. 1 shows a lengthwise cross-section of a pipette functioning as a suction device carrying a replaceable tip according to the invention.

In FIGS. 1–9 like reference numbers are used for like parts. In FIG. 1 of the drawing a suction device or a pipette is referenced as an entity with the reference number 1, and it comprises a body 2 and an associated end part 3. In the cylindrical air space 4 of the end part 3, in its lengthwise direction, a plunger 5 is moving slidably. The distant end 6 of the end part 3 has an opening 7, through which the plunger means 5 can extend into the sample space 9 of the disposable tip 8. In the embodiments shown in the figures, there is a liquid sample 10 in the sample space 9 of the disposable tip 8.

Figure 2:
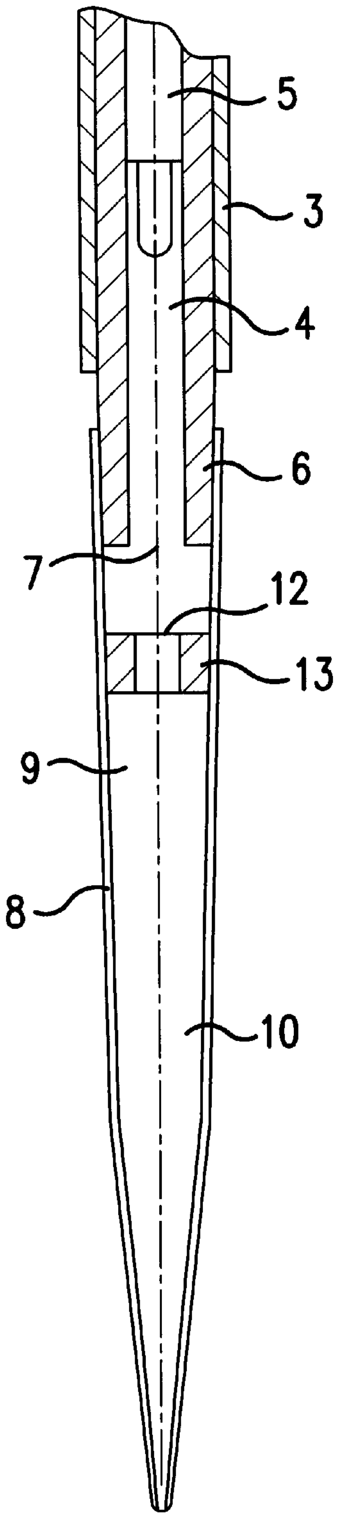
FIG. 2 shows magnified the end part of the pipette according to FIG. 1 and the tip according to the invention attached thereto.

In FIG. 2 is shown an embodiment of the invention, in which the membrane means 11 is sealingly secured onto the inner wall of the sample space 9 of the disposable tip 8. In this embodiment a membrane 12 is mounted in a suitable way, e.g. supported by a frame 13, in the sample space 9 of the disposable tip 8 so that it will not come into contact with the sample 10.

Figure 3:
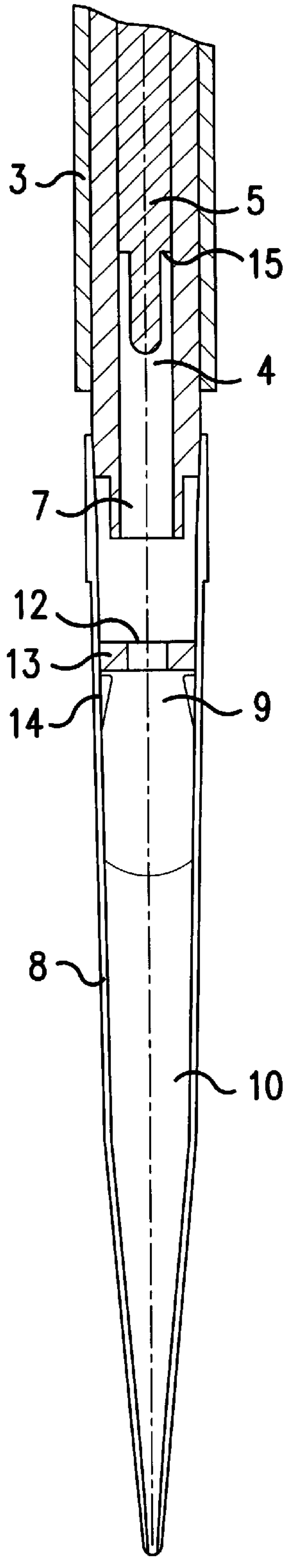
FIG. 3 shows an alternative embodiment of the membrane means according to the FIG. 2.

In another preferred embodiment of the invention shown in FIG. 3, the inside surface of the sample space 9 of the disposable tip 8 has projections, shoulders, pegs, or other means 14 protruding into the sample space 9, against which the frame 13 can be brought in contact.

According to another embodiment the membrane means 11 is mounted preferably during a manufacturing stage of the disposable tip in the sample space 9 of the disposable tip 8, to its inner wall, e.g. by welding or by another suitable method, which guarantees a gas- and liquid-tight seal.

In a preferred embodiment of the invention, the frame 13 can be brought in contact with a shoulder 15 in the plunger means 5 moving within the end part 3 of the suction device 1 for removing the disposable tip 8 and the membrane means 11 attached thereto from the end part 3 of the suction device 1 with the movement of the plunger means 5. In another alternative embodiment an extension part, associated with the plunger 5, and telescopically movable in its lengthwise direction with regard to the plunger 5 towards and away from the distal end 6 of the end part 3 of the suction device 1, is brought to move towards the end of the end part 3 through appropriate means, manually operated from the body 2 of the suction device 1, in contact with the membrane means 11, whereby the extension part pushes the disposable tip 8 and the membrane means 11 mounted therein to detach from the end part 3 of the suction device 1.

Figure 4:
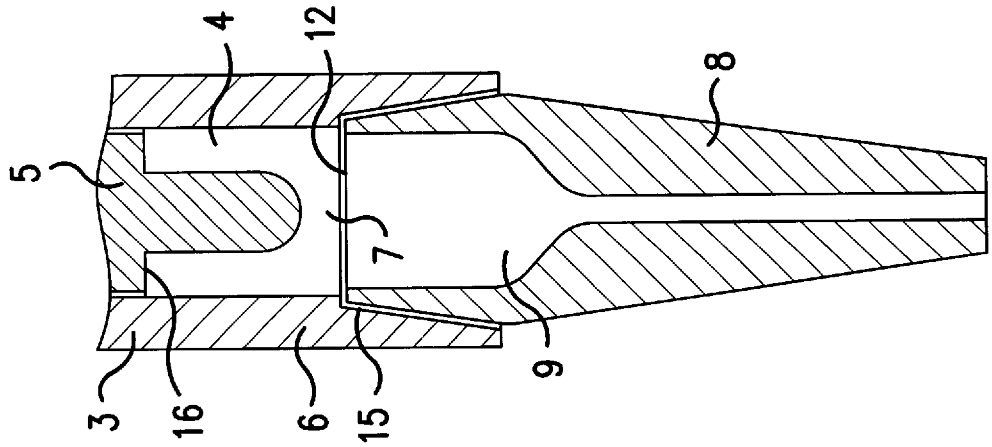
FIG. 4 shows a lengthwise cross-section of the end part of a pipette functioning as a suction device with attached replaceable tip according to the invention.

In FIG. 4 of the drawing the end part of a suction device is referenced with a reference number 3. In a cylindrical air space 4 of the end part 3, in its lengthwise direction, a plunger 5 moves slidably. The end 6 of the end part 3 has an opening 7, through which the plunger means 5 can protrude into the sample space 9 of the disposable tip 8. Onto the second end of the disposable tip 8, which is to be mounted into the suction device, a membrane 12 is secured to close this end in a gas and liquid-tight manner, the membrane 12 being of a flexibly deformable material. The membrane is secured to the surface of the mantle defining the sample space 9 of the disposable tip 8 with a suitable method guaranteeing a gas- and liquid-tight sealing, e.g. by welding or gluing. The membrane 12 can also be secured with similar methods to the outer surface of the said mantle wall of the tip 8 preferably in the second open end of the tip 8 or in its vicinity.

Figure 5:
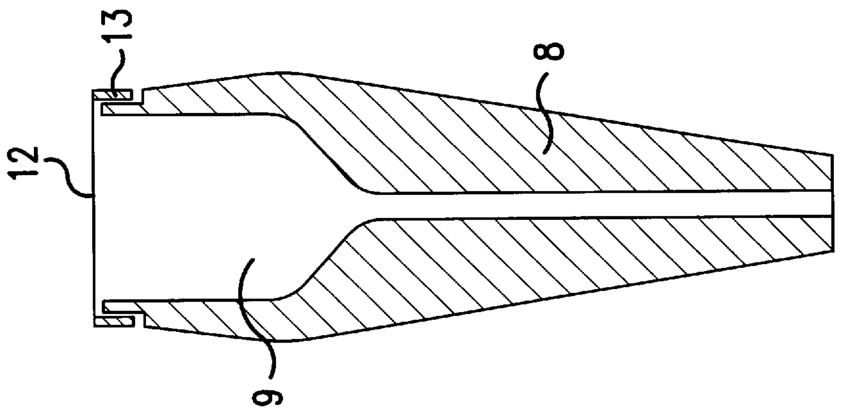

In FIG. 5 an embodiment of the invention is disclosed for sealingly securing a frame 13 and a membrane 12 mounted thereon onto the second end of the disposable tip 8, in order to close this end in a gas- and liquid-tight manner. In this embodiment the inner surface of the circular frame 13 attaches against a shoulder on the outer surface in the second end of the disposable tip 8.

Figure 6:
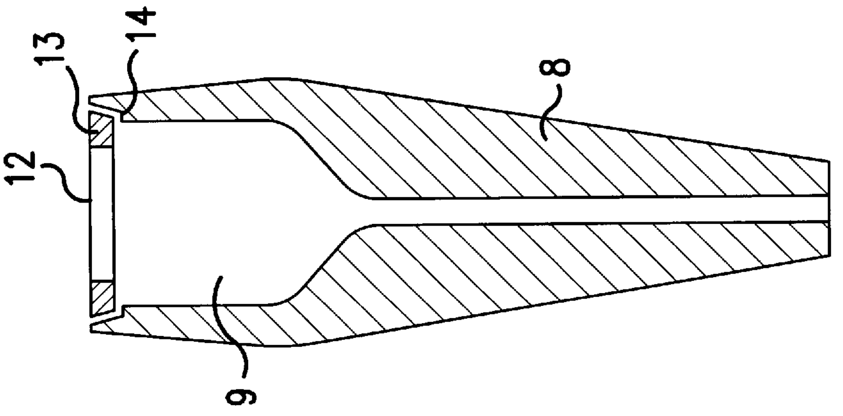
FIGS. 5, 6, and 7 show alternative embodiments of a disposable tip according to the invention.

In FIG. 6 is shown an embodiment of the invention, in which a membrane 12 is mounted onto a circular frame 13, which seals against the inner surface of the sample space 9 of the disposable tip 8 to close the second end of the disposable tip 8 in a gas- and liquid-tight manner. The outer surface of the frame 13 and the inner surface of the sample space 9 of the disposable tip 8 are in this embodiment conical surfaces sealing against each other. In another alternative embodiment of the invention, the inner surface of the sample space 9 of the disposable tip 8 has a shoulder 14, against which the frame 13 with the membrane 12 mounted thereon can be brought in contact for attaching the frame 13 to the second end of the disposable tip 8, to close this end in a gas- and liquid-tight manner.

Figure 7:
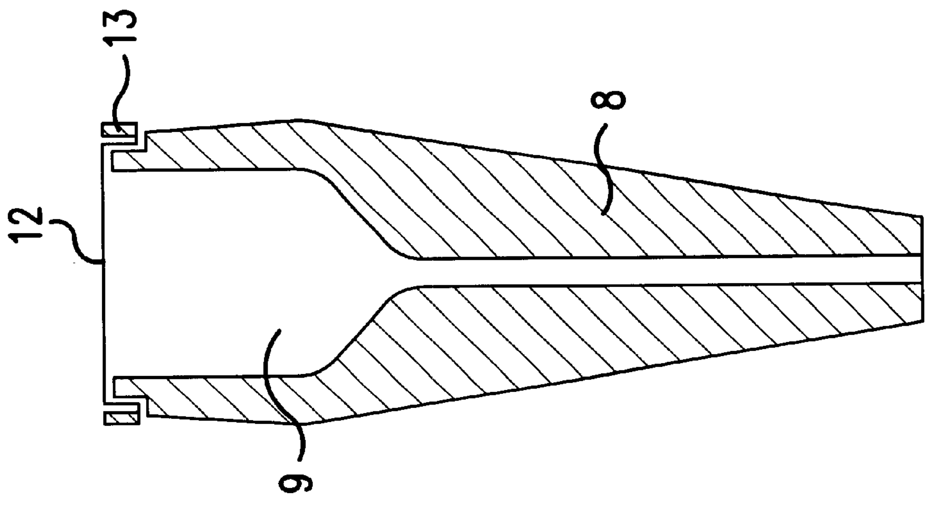

In FIG. 7 the membrane 12 is secured to the second end of the disposable tip 8 with a circular frame, sleeve, or with other similar means 13, which seals the membrane 12 in a gas- and liquid-tight manner against the mantle defining the sample space 9 of the disposable tip 8. In a preferred embodiment of this invention the second end of the disposable tip 8 has a shoulder against which the means 13 can be brought in contact. In one embodiment the means 13 can be e.g. an O-ring.

Figure 8:
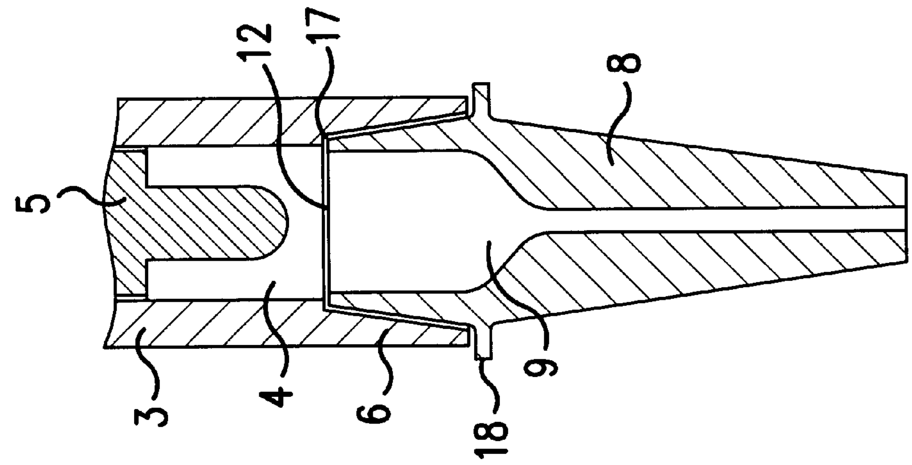

In FIG. 8 is shown the attachment of a disposable tip 8 according to the invention against a conical inner surface formed in the distal end 6 of the end part 3 of the suction device. In this embodiment the second end of the disposable tip 8 comes in contact with a shoulder 17 on the inner surface of the end part 3 of the suction device. In an alternative embodiment of the invention the disposable tip 8 has on its outer surface in the vicinity of the second end of the tip 8 a means 18, e.g. a circular projection, which comes in contact with the distal end 6 of the end part 3 of the suction device, when the tip 8 is attached to the suction device in its intended position. The movement of the means 5 moving in the cylindrical space can be translated to the disposable tip 8, to the surface of the mantle defining its sample space 9 or also through suitable means to a projection 18 in the disposable tip 8 for removing the tip from the end part 3 of the suction device.

Figure 9:
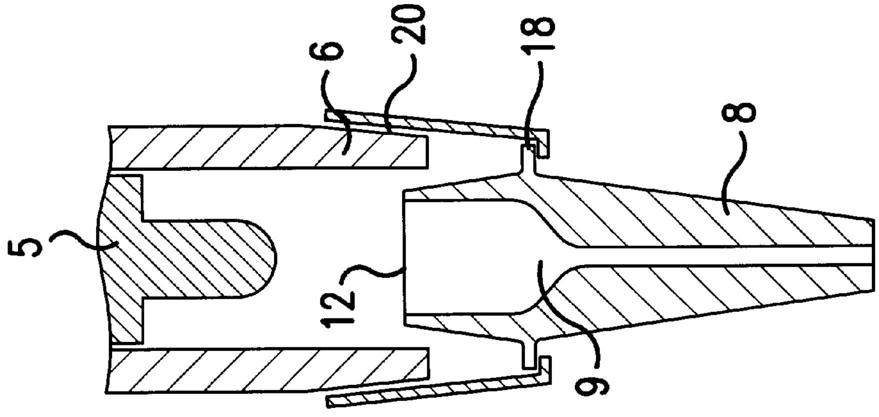
FIGS. 8 and 9 show alternative methods for mounting the disposable tip according to the invention to the end part of the suction device.

In FIG. 9 is shown the attachment of the disposable tip 8 according to the invention e.g. by a separate sleeve-like mounting means 20 onto the distal end 6 of the end part 3 of the suction device. The tip 8 according to the invention is attached to the hollow sleeve 20, preferably having a form of a truncated cone, e.g. by a circular projection 18 in the tip 8 and suitable holding means in the sleeve 20, such as e.g. shoulders, the combination of the sleeve 20 and the tip 8 in turn mounted onto the distal end of the end part 3 of the suction device preferably e.g. with a friction force. The combination of the sleeve 20 and the tip 8 can be removed from the end part 3 of the suction device by bringing the plunger 5 or an associated shoulder 16 thereof in contact with the surface formed by the mantle defining the sample space 9 of the tip 8 or with the surface formed by the membrane frame 13 being attached to the tip 8 for removing the disposable tip 8 and the sleeve 20 from the end part of the suction device. The movement of the plunger 5 can also be translated with suitable means to the tip 8 or to the membrane frame 13 of the tip 8 for removing the tip 8 or the combination of the tip 8 and the sleeve 20 from the end part 3 of the suction device.

In an embodiment of the invention, the mantle defining the sample space 9 of the disposable tip 8 forms a surface 15 at the second end of the disposable tip 8 against which a shoulder 16 at the end of the plunger 5 can be brought in contact for removing the disposable tip 8 from the end part 3 of the suction device, when the plunger 5 moves past the positions for sample taking and/or sample removing in the direction of an opening 7 in the end part 3 of the suction device, even out of the opening 7 depending on the construction of the suction device.

The surface of the circular frame 13 can also form in a preferred embodiment of the invention a surface, against which the shoulder 16 at the end of the plunger 5 can be brought in contact for removing the disposable tip 8 from the end part 3 of the suction device when the plunger 5 is moving outwards in the end part 3 of the suction device in the way described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tip with a mantle wall defining a sample space, for receiving a liquid sample, the tip having a first open end to be inserted into a liquid and a second open end for attaching the tip to a suction device for dispensing the liquid, the tip being provided with membrane means comprising a membrane made of a gas and liquid impermeable, flexible, reversibly deformable material, the membrane means being arranged to close gas and liquid passage in a gas and liquid tight manner in the tip when a plunger of the suction device is activated to receive a liquid sample in the sample space and is engaged with the membrane.

2. The tip according to claim 1, wherein the membrane is secured to a surface in the mantle wall defining the sample space at the second end of the tip.

3. The tip according to claim 1, wherein the membrane is secured to the outer surface of the mantle wall defining the sample space of the tip at the second end of the tip.

4. The tip according to claim 1, wherein the membrane means comprises a membrane mounted on a frame.

5. The tip according to claim 4, wherein the frame with the membrane mounted thereon is detachable.

6. The tip according to claim 4, wherein the frame is mounted in a gas- and liquid-tight manner to the second open end of the tip.

7. The tip according to claim 4, wherein the frame forms a contact surface, against which a plunger of the suction device can be brought in contact for removing the tip together with the membrane means from an end part of the suction device.

8. The tip according to claim 1, wherein the membrane means is mounted in a gas- and liquid-tight manner against the inside surface of the wall defining the sample space.

9. The tip according to claim 8, wherein the inside surface of the wall of the sample space is provided with projections, shoulders or pegs, protruding into the sample space, against which the frame and the membrane mounted thereon can be brought in contact for attaching the frame sealingly in the sample space.

10. The tip according to claim 1, wherein the mantle wall defining the sample space forms a contact surface at the second end of the tip, against which surface a plunger of the suction device can be brought in contact for removing the tip together with the membrane means from an end part of the suction device.

11. The tip accoding to claim 1, wherein the membrane is directly engaged with a plunger of the suction device.

* * * * *